United States Patent
Sodagar

(10) Patent No.: US 11,736,589 B2
(45) Date of Patent: *Aug. 22, 2023

(54) SYSTEMS AND METHODS FOR ACKNOWLEDGEMENT IN MEDIA PROCESSING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,338

(22) Filed: Jun. 28, 2022

(65) Prior Publication Data

US 2022/0329673 A1 Oct. 13, 2022

Related U.S. Application Data

(63) Continuation of application No. 16/838,579, filed on Apr. 2, 2020, now Pat. No. 11,399,077.

(60) Provisional application No. 62/837,594, filed on Apr. 23, 2019.

(51) Int. Cl.
*H04L 67/60* (2022.01)
*H04L 47/70* (2022.01)
*H04L 65/60* (2022.01)

(52) U.S. Cl.
CPC ............ *H04L 67/60* (2022.05); *H04L 47/827* (2013.01); *H04L 65/60* (2013.01)

(58) Field of Classification Search
CPC ....... H04L 67/32; H04L 47/827; H04L 65/60; H04L 65/80
See application file for complete search history.

(56) References Cited

U.S. PATENT DOCUMENTS

| | | | |
|---|---|---|---|
| 9,407,944 B1* | 8/2016 | Galdy | H04N 21/2402 |
| 2015/0089035 A1* | 3/2015 | Yussouff | H04L 67/288 709/223 |
| 2015/0212973 A1* | 7/2015 | Tang | H04L 67/61 708/444 |
| 2017/0286162 A1* | 10/2017 | Corley | G06F 9/4843 |
| 2019/0028691 A1 | 1/2019 | Hinds et al. | |
| 2019/0222621 A1* | 7/2019 | Kolan | H04L 67/10 |

FOREIGN PATENT DOCUMENTS

CN 101399964 A 4/2009

OTHER PUBLICATIONS

"Potential enhancements for Network-based Media Processing", ISO/IEC JTC 1/SC 29/WG 11, N18401, Mar. 2019, pp. 1-116 (116 pages total).

* cited by examiner

Primary Examiner — Cheikh T Ndiaye
(74) Attorney, Agent, or Firm — Sughrue Mion, PLLC

(57) ABSTRACT

A sub-system and method for a media processing system including a first entity and a second entity is provided. The method includes receiving, by the first entity of the media processing system from the second entity of the media processing system, a request, including a parameter having a value, to perform an action with the first entity by using the value of the parameter; and transmitting, by the first entity of the media processing system to the second entity, an acknowledgement that indicates whether the value of the parameter is accepted by the first entity to perform the action.

20 Claims, 3 Drawing Sheets

SYSTEMS AND METHODS FOR ACKNOWLEDGEMENT IN MEDIA PROCESSING

CROSS-REFERENCE TO RELATED APPLICATION

This application is a Continuation of U.S. application Ser. No. 16/838,579, filed on Apr. 2, 2020, which claims priority from U.S. Provisional Application No. 62/837,594, filed on Apr. 23, 2019, the disclosures of which are incorporated herein by reference in their entireties.

FIELD

This disclosure is related to media processing systems, more particularly network based media processing systems and acknowledgment.

BACKGROUND

Moving Picture Experts Group (MPEG) Network Based Media Processing (NBMP) project has developed a concept of processing media on cloud. The current NBMP specification defines various descriptors used in its interfaces. However, current NBMP design does not provide any multilevel and detailed acknowledgement methods.

SUMMARY

Some embodiments of the present disclosure provide systems and methods for signaling acknowledgement at multi-level and more than just pass or fail. Some embodiments of the present disclosure provide systems and methods that enable communication between a Workflow Manager and Media Processing Entities in greater detail and therefore enable allocating resources and establishing workflows in more flexible ways.

According to embodiments, a method for a media processing system, comprising a first entity and a second entity that each include at least one processor, is provided. The method comprises receiving, by the first entity of the media processing system from the second entity of the media processing system, a request, including a parameter having a value, to perform an action with the first entity by using the value of the parameter; and transmitting, by the first entity of the media processing system to the second entity, an acknowledgement that indicates whether the value of the parameter is accepted by the first entity to perform the action.

In an embodiment, the acknowledgement sent to the second entity indicates that the value is accepted for use with the parameter to perform the action. In an embodiment, the acknowledgement transmitted to the second entity indicates that the value of the parameter was not accepted by the first entity. In an embodiment, the acknowledgement transmitted to the second entity indicates that the parameter is not supported by the first entity. In an embodiment, the acknowledgement transmitted to the second entity indicates that the parameter for use by the first entity has been allocated a specified amount.

In an embodiment, the acknowledgement transmitted to the second entity includes a top level acknowledgement that indicates whether all values of all parameters of the request, including the value of the parameter, are accepted by the first entity. In an embodiment, the request received by the first entity includes a descriptor that includes the parameter having the value, and the acknowledgement transmitted to the second entity includes a descriptor level acknowledgement that indicates whether all values of all parameters of the descriptor of the request, including the value of the parameter, are accepted by the first entity. In an embodiment, the request received by the first entity includes a descriptor that includes the parameter having the value, and the acknowledgement transmitted to the second entity includes a parameter level acknowledgement that indicates whether the value of the parameter of the descriptor is accepted by the first entity or whether the parameter is supported by the first entity.

In an embodiment, the first entity comprises a media processing workflow manager and the second entity comprises a media processing source, the media processing source transmits the request as a request to the media processing workflow manager to create a workflow, the workflow to be performed by at least one media processing entity that comprises at least one processor and that is configured to process media for display, and the media processing workflow manager configured to create the workflow and cause the at least one media processing entity to perform the workflow.

In an embodiment, the first entity comprises a media processing entity and the second entity comprises a media processing workflow manager, the media processing workflow manager transmits the request as a request to the media processing entity to perform processing of media in a predetermined manner, and the media processing entity configured to perform the processing of the media.

According to embodiments, a sub-system of a media processing system is provided. The sub-system comprises at least one memory configured to store computer program code; and at least one processor configured to receive, from another sub-system of the media processing system comprising at least one processor, a request, including a parameter having a value, to perform an action by using the value of the parameter. The at least one processor of the sub-system is configured to access the computer program code and operate as instructed by the computer program code, the computer program code including acknowledgement code configured to cause the at least one processor of the sub-system to transmit, to the another sub-system, an acknowledgement that indicates whether the value of the parameter is accepted by the sub-system to perform the action.

In an embodiment, the acknowledgement transmitted to the another sub-system indicates that the value is accepted for use with the parameter to perform the action. In an embodiment, the acknowledgement transmitted to the another sub-system indicates that the value of the parameter was not accepted by the sub-system. In an embodiment, the acknowledgement transmitted to the another sub-system indicates that the parameter is not supported by the sub-system.

In an embodiment, the acknowledgement transmitted to the another sub-system includes a top level acknowledgement that indicates whether all values of all parameters of the request, including the value of the parameter, are accepted by the sub-system. In an embodiment, the request includes a descriptor that includes the parameter having the value, and the acknowledgement transmitted to the another sub-system includes a descriptor level acknowledgement that indicates whether all values of all parameters of the descriptor of the request, including the value of the parameter, are accepted by the sub-system. In an embodiment, the request includes a descriptor that includes the parameter having the value, and the acknowledgement transmitted to the another sub-system includes a parameter level acknowledgement that indicates whether the value of the parameter of the descriptor is accepted by the sub-system or whether the parameter is supported by the sub-system.

In an embodiment, the sub-system is a media processing workflow manager and the another sub-system is a media processing source, the media processing source transmits the request as a request to the media processing workflow manager to create a workflow, the workflow to be performed by at least one media processing entity that comprises at least one processor and that is configured to process media for display, and the computer program code of the media processing workflow manager further including action performance code configured to cause the at least one processor of the media processing workflow manager to create the workflow and cause the at least one media processing entity to perform the workflow.

In an embodiment, the sub-system comprises a media processing entity and the another sub-system comprises a media processing workflow manager, the media processing workflow manager transmits the request as a request to the media processing entity to perform processing of media in a predetermined manner, and the computer program code of the media processing entity further including action performance code configured to cause the at least one processor of the media processing entity to perform the processing of the media.

According to embodiments, a non-transitory computer-readable medium storing computer instructions is provided. The non-transitory computer-readable medium storing computer instructions that, when executed by at least one processor of a media processing system, cause the at least one processor to, based on receiving, from another at least one processor of the media processing system, a request, including a parameter having a value, to perform an action by using the value of the parameter: transmit, to the another at least one processor of the media processing system, an acknowledgement that indicates whether the value of the parameter is accepted by the at least one processor of the media processing system to perform the action.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Network Based Media Processing (NBMP) systems show a great potential to increase media processing efficiency, faster and lower cost deployment of media services, and ability of providing large scale deployment by leveraging the public, private, or hybrid cloud services.

Figure 1:
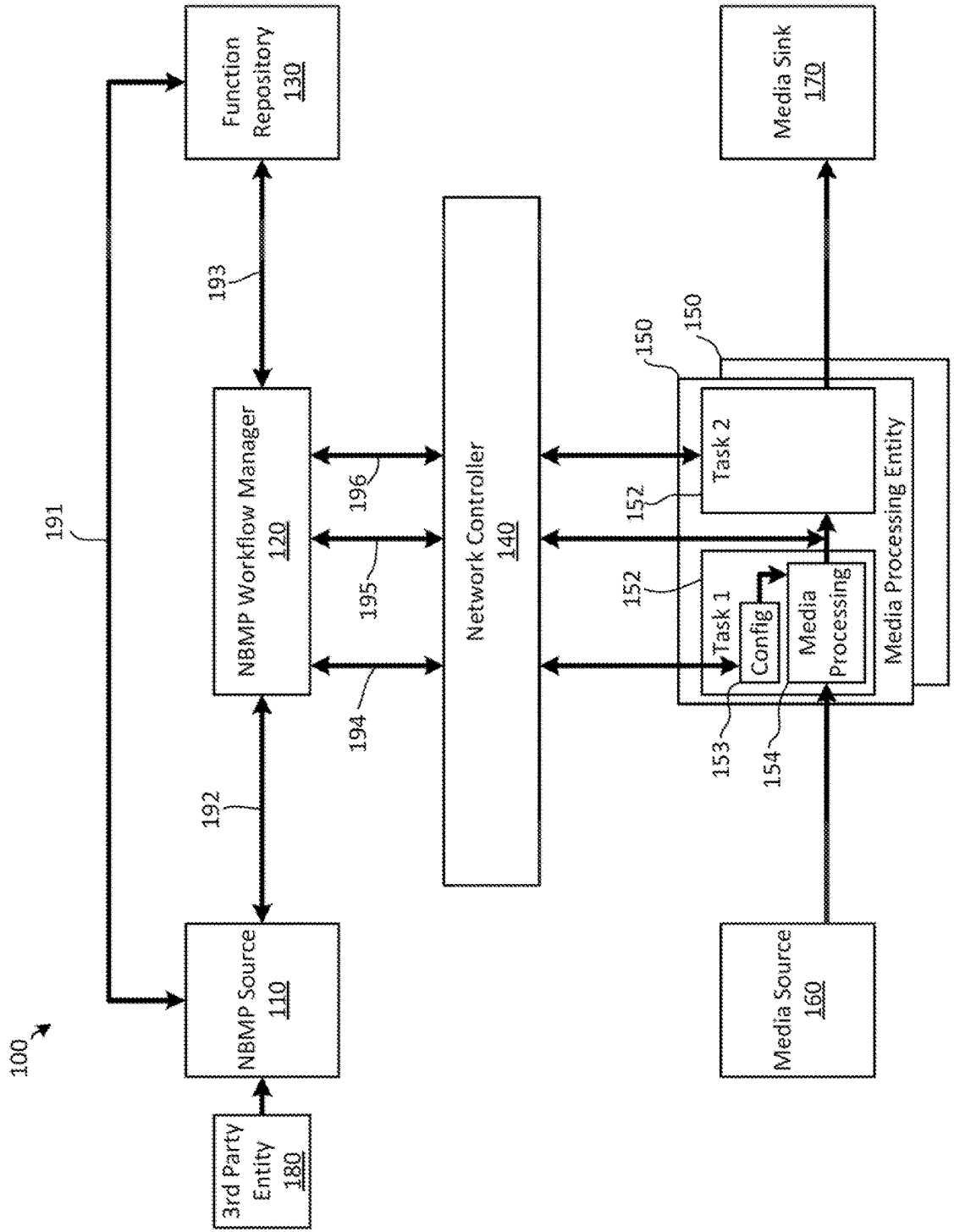
FIG. 1 illustrates a diagram of an NBMP system of an embodiment.

In an embodiment of the present disclosure, an NBMP system 100 is provided. With reference to FIG. 1, the NBMP system 100 comprises an NBMP source 110, an NBMP workflow manager 120, a function repository 130, a network controller 140, one or more media processing entities 150, a media source 160, and a media sink 170.

The NBMP source 110 may receive instructions from a third party entity 180, may communicate with the NBMP workflow manager 120 via an NBMP workflow API 192, and may communicate with the function repository 130 via a function discovery API 191. For example, the NBMP source 110 may send a workflow description document(s) to the NBMP workflow manager 120, and may read the function description of functions stored in the function repository 130, the functions being media processing functions stored in memory of the function repository 130 such as, for example, functions of media decoding, feature point extraction, camera parameter extraction, projection method, seam information extraction, blending, post-processing, and encoding. The NBMP source 110 may comprise at least one processor and memory that stores code configured to cause the at least processor to perform the functions of the NBMP source 110.

The NBMP source 110 may request the NBMP workflow manager 120 to create workflow including tasks 152 to be performed by the one or more media processing entities 150 by sending the workflow description document, which may include several descriptors, each of which may have several parameters.

For example, the NBMP source 110 may select functions stored in the function repository 130 and send the workflow description document to the NBMP workflow manager 120 that includes a variety of descriptors for description details such as input and output data, required functions, and requirements for the workflow. The workflow description document may include a set of task descriptions and a connection map of inputs and outputs of tasks 152 to be performed by one or more of the media processing entities 150. When the NBMP workflow manager 120 receives such information from the NBMP source 110, the NBMP workflow manager 120 may create the workflow by instantiating the tasks based on function names and connecting the tasks in accordance with the connection map.

Alternatively or additionally, the NBMP source 110 may request the NBMP workflow manager 120 to create workflow by using a set of keywords. For example, NBMP source 110 may send the NBMP workflow manager 120 the workflow description document that may include a set of keywords that the NBMP workflow manager 120 may use to find appropriate functions stored in the function repository 130. When the NBMP workflow manager 120 receives such information from the NBMP source 110, the NBMP workflow manager 120 may create the workflow by searching for appropriate functions using the keywords that may be specified in a Processing Descriptor of the workflow description document, and use the other descriptors in the workflow description document to provision tasks and connect them to create the workflow.

The NBMP workflow manager 120 may communicate with the function repository 130 via a function discovery API 193, which may be a same or different API from the function discovery API 191, and may communicate with one or more of the media processing entities 150, through the network controller 140, via an NBMP task API 194, an NBMP link API 195, and a function discovery API 196, which may be a same or different API from the function discovery API 193 and the function discovery API 191. The NBMP workflow manager 120 may comprise at least one processor and memory that stores code configured to cause the at least processor to perform the functions of the NBMP workflow manager 120.

The NBMP workflow manager 120 may use the NBMP task API 194 to setup, configure, manage, and monitor one or more tasks 152 of a workflow that is performable by the one or more media processing entities 150. In an embodiment, the NBMP workflow manager 120 may use the NBMP task API 194 to update and destroy the tasks 152. In order to configure, manage, and monitor tasks 152 of the workflow, the NBMP workflow manager 120 may send messages, such as requests, to one or more of the media processing entities 150, wherein each message may have several descriptors, each of which have several parameters. The tasks 152 may each include media processing functions 154 and configurations 153 for the media processing functions 154.

In an embodiment, after receiving a workflow description document from the NBMP source 110 that does not include a list of the tasks (e.g. includes a list of keywords instead of a list of tasks), the NBMP workflow manager 120 may select the tasks based on the descriptions of the tasks in the workflow description document to search the function repository 130, via the function discovery API 193, to find the appropriate functions to run as tasks 152 for a current workflow. For example, the NBMP workflow manager 120 may select the tasks based on keywords provided in the workflow description document. After the appropriate functions are identified by using the keywords or the set of task descriptions that is provided by the NBMP source 110, the NBMP workflow manager 120 may configure the selected tasks in the workflow by using the NBMP task API 194. For example, the NBMP workflow manager 120 may extract configuration data from information received from the NBMP source, and configure the tasks 152 based on the configuration data.

The one or more media processing entities 150 may be configured to receive media content from the media source 160, process the media content in accordance with the workflow, that includes tasks 150, created by the NBMP workflow manager 120, and output the processed media content to the media sink 170. The one or more media processing entities 150 may each comprise at least one processor and memory that stores code configured to cause the at least processor to perform the functions of the media processing entities 150.

The network controller 140 may comprise at least one processor and memory that stores code configured to cause the at least processor to perform the functions of the network controller 140.

The media source 160 may include memory that stores media and may be integrated with or separate from the NBMP source 110. In an embodiment, the NBMP workflow manager 120 may notify the NBMP source 110 when a workflow is prepared and the media source 160 may transmit media content to the one or more of the media processing entities 150 based on the notification that the workflow is prepared.

The media sink 170 may comprises at least one processor and at least one display that is configured to display the media that is processed by the one or more media processing entities 150.

The third party entity 180 may comprise at least one processor and memory that stores code configured to cause the at least processor to perform the functions of the third party entity 180.

As discussed above, messages from the NBMP Source 110 (e.g. a workflow description document for requesting creation of a workflow) to the NBMP workflow manager 120, and messages (e.g. for causing the workflow to be performed) from the NBMP workflow manager 120 to the one or more media processing entities 150 may include several descriptors, each of which may have several parameters. In cases, communication between any of the components of the NBMP system 100 using an API may include several descriptors, each of which may have several parameters.

Some embodiments of the present disclosure allow multi-level acknowledge signaling in one or more of the above APIs, including the workflow API 192, the Task API 194, the link API 195, and the function discovery APIs 191, 193, and 196.

For example, some embodiments of the present disclosure enable the one or more media processing entities 150 and/or the NBMP workflow manager 120 to acknowledge the accommodation of resources to the NBMP source and the NBMP workflow manager 120, respectively, as once per descriptor or per parameter. Also, some embodiments of the present disclosure enable the signaling of more than a yes/no response by defining what level of support is being added.

An acknowledgement scheme of the present disclosure is described below, wherein the acknowledgement scheme is for the one or more media processing entities 150 to the NBMP workflow manager 120, as an example.

In order to provide a standard detail acknowledgement by a media processing entity 150, the same descriptors provided to the media processing entity 150 may be used as the acknowledgement. However, instead of the values of the descriptors provided to the media processing entity 150, the values for each parameter of the descriptors could be, for example, one of the following identified in Table 1:

TABLE 1

Possible values for acknowledgement

| Value | Description |
|---|---|
| Accepted | This entity secured the requested value for the parameter. |
| Failed | This entity fails to secure the requested value for this parameter. |
| NotSupported | This parameter is not supported by this entity. |
| Allocated | This parameter can be secured for the value/string XXX in string "Allocated: XXX", in which XXX is a number or string or array according to the corresponding parameter's data type. |

The startup delay descriptor of Table 2 below is used as an example descriptor to help describe an acknowledgement scheme of an embodiment of the present disclosure.

TABLE 2

Delay Descriptor

| Parameter Name | Description | Data Type |
|---|---|---|
| Delay | Amount of delay before task startup. | Number |

The startup delay descriptor may have the following JSON schema:

```
{
    "title": "The Delay Descriptor Schema",
    "type": "object",
    "required": [
        "delay"
    ],
    "properties": {
```

```
        "delay": {
            "type": "integer"
        }
    }
}
```

When the NBMP workflow manager 120 requests a specific startup delay, the following descriptor may be added to the request to be sent to the media processing entity 150:

```
{
    "title": "The Delay Descriptor Schema",
    "delay": 20
}
```

The media processing entity 150 can acknowledge with one of the followings descriptors:

1. Accepted:
   ```
   {
       "title": "The Delay Descriptor Response",
       "delay": "Accepted"
   }
   ```
2. Failed:
   ```
   {
       "title": "The Delay Descriptor Response",
       "delay": "Failed"
   }
   ```
3. No Supported:
   ```
   {
       "title": "The Delay Descriptor Response",
       "delay": "NotSupported"
   }
   ```
4. Supported for 40 sec:
   ```
   {
       "title": "The Delay Descriptor Response",
       "delay": "Allocated: 40"
   }
   ```

Embodiments of the present disclosure may provide multi-level acknowledgement. For example, in response to a request, the one or more media processing entities 150 or the NBMP workflow manager 120 may provide a top level, descriptor level, or a parameter level acknowledgement to the source of the request. A top level acknowledgement may indicate that the entire request can be accommodated. A descriptor level acknowledgement may indicate that the request may be accommodated for some descriptors of the request and not for other descriptors of the request. A parameter level acknowledgement may indicate that the request may be accommodated for some parameters of the request and not for other parameters of the request.

Examples of the top level, descriptor level, and parameter level acknowledgements are provided below.

The acknowledge descriptor of Table 3 below is used as an example descriptor to describe a multi-level acknowledgement scheme of an embodiment of the present disclosure.

TABLE 3

Acknowledge Descriptor

| Parameter Name | Description | Data Type |
| --- | --- | --- |
| Acknowledge | The acknowledgement type | String |

The acknowledge descriptor may have the following JSON schema:

```
{
    "title": "The Acknowledge Schema",
    "type": "object",
    "required": [
        "acknowledge"
    ],
    "properties": {
        " acknowledge": {
            "type": "string"
        }
    }
}
```

An example of a top-level acknowledgement is:

```
{
    "title": "The Acknowledge Schema",
    " acknowledge": "Accepted"
}
```

With respect to descriptor level acknowledgement, the same acknowledge object can be used for each descriptor. For instance, a Processing descriptor can be acknowledged as follows:

```
{
    "title": "The Processing Descriptor",
    {
        "title": "The Acknowledge Schema",
        "acknowledge": "Accepted"
    }
}
```

With respect to parameter level acknowledgement, the same acknowledge object may be used for each parameter. For example, a bandwidth parameter of the Processing descriptor can be acknowledged as follows:

```
{
    "title": "The Processing Descriptor",
    {
        "bandwidth": 200,
        {
            "title": "The Acknowledge Schema",
            "acknowledge": "Allocated: 180"
        }
    }
}
```

Alternatively, with respect to parameter level acknowledgement, the descriptor value may be changed to acknowledge one or more parameters. For example, a bandwidth parameter of the Processing descriptor can be acknowledged as follows:

```
{
    "title": "The Processing Descriptor",
    {
        "bandwidth": "Allocated: 180",
    }
}
```

Systems of the present disclosure, including NBMP system 100, may include one or more components that perform any of the acknowledgement schemes of the present disclosure, including the acknowledgement schemes described above, based on receiving a request from another component.

Figure 2:
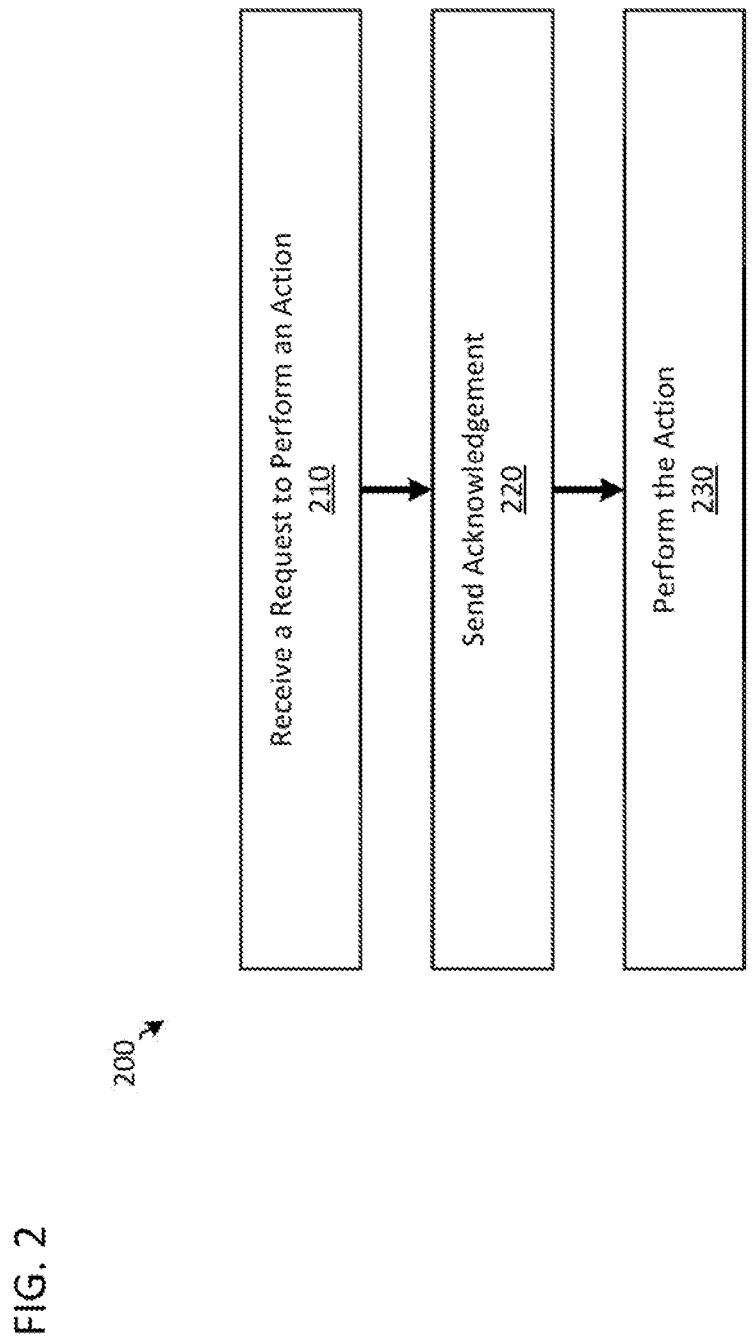
FIG. 2 illustrates a flowchart of a method performed by an NBMP system of an embodiment.

With reference to FIG. 2, components of systems of the present disclosure may implement an acknowledgement scheme of the present disclosure by performing method 200. For example, a first component of a system of the present disclosure receives a request from a second component of the system to perform an action that may, for example, relate to media processing (210). Following, the first component may send acknowledgement directly or indirectly to the second component (220). Further, the first component may perform the action if the action is performable (230). Although method 200 illustrates step 230 after step 220, step 230 may alternatively occur before or during step 220 in embodiments.

Figure 3:
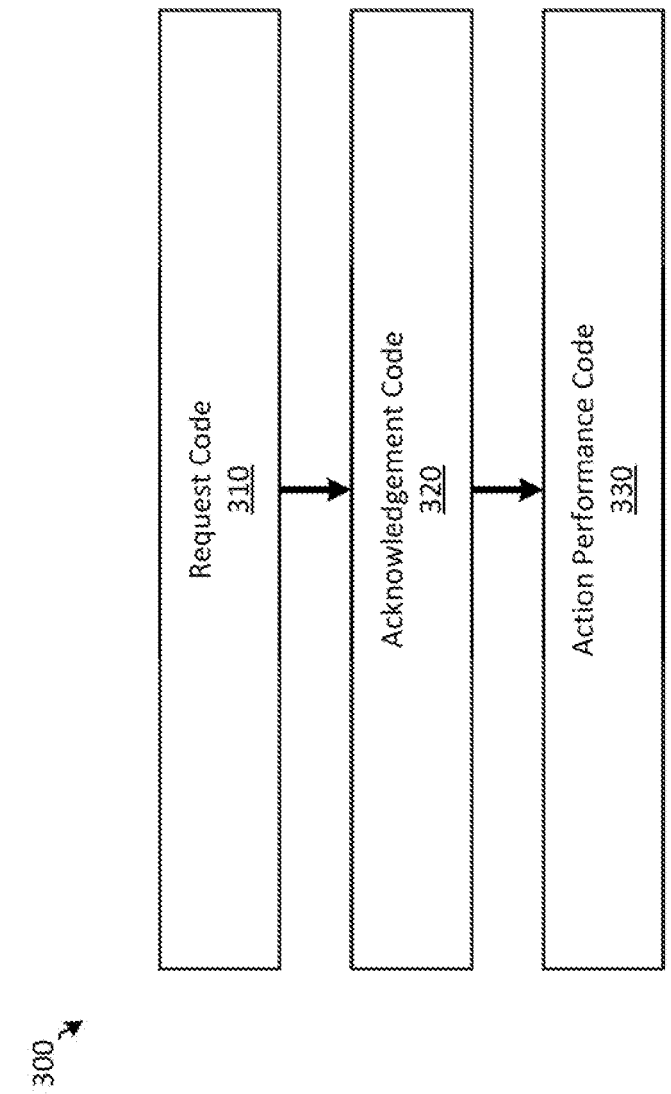
FIG. 3 illustrates a diagram of computer program code stored by an NBMP system of an embodiment.

With reference to FIG. 3, systems of the present disclosure, including NBMP system 100, may comprise code 300.

For example, a first component of the system may include memory storing acknowledgement code 320 and action performance code 330, and at least one processor to perform the acknowledgement code 320 and the action performance code 330. A second component of the system may include memory storing request code 310 and at least one processor to perform the request code 310.

The request code 310 may cause the at least one processor of the second component to send a request to a first component of the system to perform an action that may, for example, relate to media processing.

After the first component of the system receives the request, the acknowledgement code 320 may cause the at least one processor of the first component to send acknowledgement, in accordance with an acknowledgement scheme of the present disclosure, to the second entity of the system. Additionally, the action performance code 330 may cause the at least one processor of the first component to perform the action if the action is performable.

In an embodiment, the NBMP workflow manager 120 and the NBMP source 110, illustrated in FIG. 1, may be the first component and the second component, respectively, that are described in relation to FIGS. 2-3. For example, the NBMP workflow manager 120 may provide acknowledgement to the NBMP source 110, based on receiving a request from the NBMP source 110 to create a workflow to be performed by at least one media processing entity 150 to process media for display.

Alternatively or additionally, a media processing entity 150 may provide acknowledgement to the NBMP workflow manager 120, based on receiving a request from the NBMP workflow manager 120 to, for example, control the media processing entity 150 for processing media for display. That is, the media processing entity 150 may be the first component and the NBMP workflow manager 120 may be the second component that are described in relation to FIGS. 2-3. The request to the media processing entity 150 may involve, for example, configuring, managing, and/or monitoring one or more tasks 152 for media processing to be performed by the media processing entity 150.

The systems and methods of the present disclosure may be used separately or combined in any order. Further, each of the methods and components of systems of the present disclosure may be implemented by processing circuitry (e.g., one or more processors or one or more integrated circuits). For example, the one or more processors of each method and component may execute a program that is stored in a non-transitory computer-readable medium to cause the one or more processors of each method and component to perform their respective functions. In an embodiment, one or more of the components in the system 100 may be implemented in a cloud computing environment. For example, one or more of the third party entity 180, the NBMP source 110, the NBMP workflow manager 120, the function repository 130, the network controller 140, the media source 160, the media processing entities 150, and the media sink 170 may implemented in a same or different cloud computing environment comprising at least one processor.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for a media processing system comprising a first entity and a second entity that each include at least one processor, the method comprising:
   receiving, by the first entity of the media processing system from the second entity of the media processing system, a request, including a parameter having a value, to perform an action with the first entity by using the value of the parameter; and
   transmitting, by the first entity of the media processing system to the second entity after receiving the request, an acknowledgement that indicates whether the value of the parameter is accepted by the first entity to perform the action; and
   performing, by the first entity of the media processing system, the action based on receiving the request.

2. The method of claim 1, wherein the acknowledgement transmitted to the second entity indicates that the value is accepted for use with the parameter to perform the action.

3. The method of claim 1, wherein the acknowledgement transmitted to the second entity indicates that the value of the parameter was not accepted by the first entity.

4. The method of claim 1, wherein the acknowledgement transmitted to the second entity indicates that the parameter is not supported by the first entity.

5. The method of claim 1, wherein the acknowledgement transmitted to the second entity indicates that the parameter for use by the first entity has been allocated a specified amount.

6. The method of claim 1, wherein the acknowledgement transmitted to the second entity has a JSON schema that includes a top level acknowledgement that indicates whether all values of all parameters of the request, including the value of the parameter, are accepted by the first entity.

7. The method of claim 1, wherein
the request received by the first entity includes a descriptor that includes the parameter having the value, and
the acknowledgement transmitted to the second entity has a JSON schema that includes a descriptor level acknowledgement that indicates whether all values of all parameters of the descriptor of the request, including the value of the parameter, are accepted by the first entity.

8. The method of claim 1, wherein
the request received by the first entity includes a descriptor that includes the parameter having the value, and
the acknowledgement transmitted to the second entity has a JSON schema that includes a parameter level acknowledgement that indicates whether the value of the parameter of the descriptor is accepted by the first entity or whether the parameter is supported by the first entity.

9. The method of claim 1, wherein
the first entity comprises an media processing workflow manager and the second entity comprises a media processing source,
the media processing source transmits the request as a request to the media processing workflow manager to create a workflow, the workflow to be performed by at least one media processing entity that comprises at least one processor and that is configured to process media for display, and
the media processing workflow manager configured to create the workflow and cause the at least one media processing entity to perform the workflow as the action.

10. The method of claim 1, wherein
the first entity comprises a media processing entity and the second entity comprises an media processing workflow manager,
the media processing workflow manager transmits the request as a request to the media processing entity to perform processing of media in a predetermined manner, and
the media processing entity configured to perform the processing of the media as the action.

11. A sub-system of a media processing system, the sub-system comprising:
at least one memory configured to store computer program code; and
at least one processor configured to receive, from another sub-system of the media processing system comprising at least one processor, a request, including a parameter having a value, to perform an action by using the value of the parameter, wherein
the at least one processor of the sub-system is configured to access the computer program code and operate as instructed by the computer program code, the computer program code including:
acknowledgement code configured to cause the at least one processor of the sub-system to transmit, to the another sub-system after receiving the request, an acknowledgement that indicates whether the value of the parameter is accepted by the sub-system to perform the action; and
action performance code configured to cause the at least one processor of the sub-system to perform the action based on receiving the request.

12. The sub-system of claim 11, wherein the acknowledgement transmitted to the another sub-system indicates that the value is accepted for use with the parameter to perform the action.

13. The sub-system of claim 11, wherein the acknowledgement transmitted to the another sub-system indicates that the value of the parameter was not accepted by the sub-system.

14. The sub-system of claim 11, wherein the acknowledgement transmitted to the another sub-system indicates that the parameter is not supported by the sub-system.

15. The sub-system of claim 11, wherein the acknowledgement transmitted to the another sub-system has a JSON schema that includes a top level acknowledgement that indicates whether all values of all parameters of the request, including the value of the parameter, are accepted by the sub-system.

16. The sub-system of claim 11, wherein
the request includes a descriptor that includes the parameter having the value, and
the acknowledgement transmitted to the another sub-system has a JSON schema that includes a descriptor level acknowledgement that indicates whether all values of all parameters of the descriptor of the request, including the value of the parameter, are accepted by the sub-system.

17. The sub-system of claim 11, wherein
the request includes a descriptor that includes the parameter having the value, and
the acknowledgement transmitted to the another sub-system has a JSON schema that includes a parameter level acknowledgement that indicates whether the value of the parameter of the descriptor is accepted by the sub-system or whether the parameter is supported by the sub-system.

18. The sub-system of claim 11, wherein
the sub-system comprises an media processing workflow manager and the another sub-system comprises an media processing source,
the media processing source transmits the request as a request to the media processing workflow manager to create a workflow, the workflow to be performed by at least one media processing entity that comprises at least one processor and that is configured to process media for display, and
the action performance code is further configured to cause the at least one processor of the media processing workflow manager to create the workflow and cause the at least one media processing entity to perform the workflow as the action.

19. The sub-system of claim 11, wherein
the sub-system is a media processing entity and the another sub-system comprises an media processing workflow manager,
the media processing workflow manager transmits the request as a request to the media processing entity to perform processing of media in a predetermined manner, and the action performance code is further configured to cause the at least one processor of the media processing entity to perform the processing of the media as the action.

20. A non-transitory computer-readable medium storing computer instructions that, when executed by at least one processor of a media processing system, cause the at least one processor to, based on receiving, from another at least one processor of the media processing system, a request, including a parameter having a value, to perform an action by using the value of the parameter:

transmit, to the another at least one processor of the media processing system after receiving the request, an acknowledgement that indicates whether the value of the parameter is accepted by the at least one processor of the media processing system to perform the action; and perform the action based on receiving the request.

* * * * *